United States Patent
Laughlin et al.

(10) Patent No.: US 10,620,629 B2
(45) Date of Patent: Apr. 14, 2020

(54) AUTONOMOUS SWARM FOR RAPID VEHICLE TURNAROUND

(71) Applicant: The Boeing Company, Chicago, IL (US)

(72) Inventors: Brian D. Laughlin, Wichita, KS (US); John W. Glatfelter, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 31 days.

(21) Appl. No.: 15/629,994

(22) Filed: Jun. 22, 2017

(65) Prior Publication Data

US 2018/0373246 A1    Dec. 27, 2018

(51) Int. Cl.
| | |
|---|---|
| G05D 1/00 | (2006.01) |
| G06Q 10/08 | (2012.01) |
| G06Q 50/30 | (2012.01) |
| G06Q 50/28 | (2012.01) |
| G06Q 10/06 | (2012.01) |
| B64F 1/00 | (2006.01) |
| B64F 1/36 | (2017.01) |

(52) U.S. Cl.
CPC .......... *G05D 1/0088* (2013.01); *B64F 1/002* (2013.01); *B64F 1/364* (2013.01); *B64F 1/368* (2013.01); *G05D 1/0083* (2013.01); *G06Q 10/06311* (2013.01); *G06Q 10/06316* (2013.01); *G06Q 10/08* (2013.01); *G06Q 50/28* (2013.01); *G06Q 50/30* (2013.01)

(58) Field of Classification Search
CPC .................................................. G05D 1/0088
See application file for complete search history.

(56) References Cited

U.S. PATENT DOCUMENTS

| | | | |
|---|---|---|---|
| 8,255,097 B1* | 8/2012 | Wander | G06Q 10/06 701/3 |
| 2003/0050746 A1* | 3/2003 | Baiada | G08G 5/0043 701/3 |
| 2006/0284008 A1* | 12/2006 | Nance | B64D 45/00 244/100 R |
| 2008/0046167 A1 | 2/2008 | Small et al. | |

(Continued)

FOREIGN PATENT DOCUMENTS

| | | |
|---|---|---|
| EP | 2 521 087 | 11/2012 |
| EP | 2 950 250 | 12/2015 |

(Continued)

OTHER PUBLICATIONS

Extended European Search Report prepared by the European Patent Office in application No. EP 18 17 8398.6 dated Aug. 6, 2018.

*Primary Examiner* — Imran K Mustafa
(74) *Attorney, Agent, or Firm* — McDonnell Boehnen Hulbert & Berghoff LLP

(57) ABSTRACT

An example computing device may detect through a sensor that an aircraft started a particular phase of flight. The computing device may autonomously take independent actions on behalf of service operators to automatically allocate and assign resources to the aircraft based on availability of the resources and the flight phase of the aircraft. The computing device may thus trigger preparation of a particular service ahead of arrival of the aircraft, such that the associated service equipment is ready when the aircraft arrives at the gate.

20 Claims, 10 Drawing Sheets

(56) References Cited

U.S. PATENT DOCUMENTS

| | | | |
|---|---|---|---|
| 2010/0063650 A1* | 3/2010 | Vian | B64F 5/60 |
| | | | 701/2 |
| 2010/0113149 A1* | 5/2010 | Suddreth | G01C 23/00 |
| | | | 463/31 |
| 2013/0184977 A1 | 7/2013 | Venkatasubramanian | |
| 2015/0142214 A1* | 5/2015 | Cox | G05D 1/0202 |
| | | | 701/3 |
| 2015/0243112 A1* | 8/2015 | Jensen | G07C 5/0808 |
| | | | 701/33.4 |
| 2016/0247247 A1 | 8/2016 | Scicluna | |
| 2016/0351061 A1* | 12/2016 | Lamkin | G08G 5/065 |

FOREIGN PATENT DOCUMENTS

| | | |
|---|---|---|
| EP | 3 115 946 | 1/2017 |
| GB | 2 393 836 | 4/2004 |
| WO | WO 99/08251 | 2/1999 |

* cited by examiner

AUTONOMOUS SWARM FOR RAPID VEHICLE TURNAROUND

FIELD

The present disclosure relates generally to rapid turnaround of vehicles, and more particularly to preparing a vehicle for further or additional uses following use of the vehicle.

BACKGROUND

A vehicle of any type (e.g., an aircraft, a ship, or a car) may be performing a trip from one location to another, and upon reaching its destination, the vehicle may be serviced while at the destination before the vehicle is ready to perform another trip or task. For example, a car that is participating in car racing, may be subjected to frequent stops at which maintenance operations are performed on the car, before the car is ready to continue the race.

As another example, in aviation, aircraft ground handling defines the servicing of an aircraft while it is on the ground and parked at a terminal gate of an airport. Many servicing operations are performed on the aircraft to prepare the aircraft for another flight. Ground handling addresses the many service requirements of an airliner between the time the aircraft arrives at a terminal gate and the time it departs on its next flight. Speed, efficiency, and accuracy of the servicing operations determine the turnaround time (e.g., the time during which the aircraft remains parked at the gate).

Example ground handling services for an aircraft include cabin service to ensure passenger comfort. While cabin cleaning comprises the bulk of the effort, cabin service also includes tasks such as replenishing onboard consumables (soap, tissues and toilet paper, reading materials) and washable items like pillows and blankets.

Another example service includes catering. Catering involves unloading of unused food and drink from the aircraft, and the loading of fresh food and drink for passengers and crew. Airline meals are typically delivered in airline service trolleys. Empty or trash-filled trolley from the previous flight is replaced with fresh ones.

Another example service includes ramp service. Ramp service includes operations such as guiding the aircraft into and out of the parking position (by way of aircraft marshalling); towing the aircraft with pushback tow tractors; lavatory drainage; water cartage; maintenance and checking of air conditioning systems and air-start units; luggage handling, by means of belt loaders and baggage carts; handling gate checked luggage on the tarmac as passengers disembark; air cargo handling by means of cargo dollies and cargo loaders; preparing, mobilizing, and delivering catering trucks to the gate; refueling, which may be done using a refueling tanker truck or refueling pumper; providing ground power so that engines of the aircraft are not running to provide aircraft power on the ground; providing passenger stairs in some cases where a jet bridge is not available); providing wheelchair lifts if requested; providing hydraulic units that provide hydraulic power to the aircraft externally; and deicing, among other operations.

Another example service includes passenger service. Passenger service involves services inside the airport terminal such as providing check-in counter services for the passengers departing on the aircraft; providing gate arrival and departure services, where agents meet a flight on arrival as well as provide departure services including boarding passengers and closing the flight; and staffing the transfer counters, customer service counters, and airline lounges.

Another example service includes field operation service. This service involves dispatching the aircraft and maintaining communication with the rest of the airline operation at the airport and with Air Traffic Control.

As indicated by the list of services above, a large swarm of activities are initiated and performed to prepare an aircraft for a subsequent flight. Some of these activities may occur in sequence while other can be performed in parallel. A delay in any of these services may delay a flight by keeping the aircraft parked at the gate. It is estimated that such delays in a turnaround of an aircraft may cost the airliner up to $150 k. Additionally, customer dissatisfaction and negative impact on the reputation of the airliner because of the delays and the disruption of customer's schedules may further affect profitability of the airliner. Thus, turnaround time between an aircraft pulling to the gate and pushing back to fly with a full set of passengers in a short period of time may increase airline profitability and facilitate maintaining airline reputation of on-time arrival.

While a commercial aircraft is used above as an example, a similar swarm of activities is conducted to prepare other types of vehicles or machinery for further operation. Other example types of vehicles and machinery that go through frequent servicing operations include passenger cars, ships, helicopters, machinery at a manufacturing facilities, etc.

Servicing operations may be highly manual and labor driven. Personnel are tasked to find, gather, and take equipment to a service location (e.g., terminal gate). Such activities may cause undue delays because of the potential for lack of coordination and preparedness. Such delay may be more prominent in a site that involves performing such operations on many vehicles. For example, at an airport, many aircraft are being processed and serviced simultaneously at different gates, thus sharing resources and servicing equipment. If an airliner is not able to perform even a single type of service, the aircraft may be delayed. Further, by asking personnel to find, gather, roster, and deliver tools and equipment to a service location, the personnel spend less time and effort on completing service tasks at hand.

It may thus be desirable to implement a system that reduces turnaround time of a vehicle by automating tasks such as coordination, preparedness, and timeliness of finding, gathering, and delivering tools and equipment. This way, speed, efficiency, and accuracy of vehicle/equipment servicing operations may be enhanced.

SUMMARY

The present disclosure describes embodiments that relate to autonomous swarm for rapid vehicle turnaround.

In one aspect, the present disclosure describes a method. The method includes: (i) determining by a computing device, based on information received from a first group of sensors in communication with the computing device, that an aircraft is in a descent flight phase prior to the aircraft reaching a gate at an airport by a first predetermined amount of time; (ii) responsively, triggering, by the computing device, preparation of servicing equipment associated with servicing the aircraft to be ready for a subsequent flight, where preparation time of the servicing equipment is substantially equal to or less than the first predetermined amount of time; (iii) determining by the computing device, based on information received from a second group of sensors in communication with the computing device, that the aircraft landed and has started a taxi-in flight phase prior to reaching the gate by a second predetermined amount of time; (iv) responsively, triggering, by the computing device, deployment of the servicing equipment toward the gate, wherein arrival of the servicing equipment at the gate takes substantially the second predetermined amount of time or less; (v) determining by the computing device, based on information received from a third group of sensors in communication with the computing device, that the aircraft has arrived at the gate; (vi) responsively, triggering, by the computing device, use of the servicing equipment to prepare the aircraft for the subsequent flight.

In another aspect, the present disclosure describes a non-transitory computer readable medium having stored therein instructions that, in response to execution by a computing device, cause the computing device to perform operations. The operations include: (i) determining, based on information received from a first group of sensors in communication with the computing device, that an aircraft is in a descent flight phase prior to the aircraft reaching a gate at an airport by a first predetermined amount of time; (ii) responsively, triggering preparation of servicing equipment associated with servicing the aircraft to be ready for a subsequent flight, where preparation time of the servicing equipment is substantially equal to or less than the first predetermined amount of time; (iii) determining, based on information received from a second group of sensors in communication with the computing device, that the aircraft landed and has started a taxi-in flight phase prior to reaching the gate by a second predetermined amount of time; (iv) responsively, triggering deployment of the servicing equipment toward the gate, where arrival of the servicing equipment at the gate takes substantially the second predetermined amount of time or less; (v) determining, based on information received from a third group of sensors in communication with the computing device, that the aircraft has arrived at the gate; and (vi) responsively, triggering use of the servicing equipment to prepare the aircraft for the subsequent flight.

In still another aspect, the present disclosure describes a system including one or more processors; and data storage storing thereon instructions, that when executed by the one or more processors, cause the one or more processors to perform operations. The operations include: (i) determining, based on information received from a first group of sensors in communication with the one or more processors, that an aircraft is in a descent flight phase prior to the aircraft reaching a gate at an airport by a first predetermined amount of time; (ii) responsively, triggering preparation of servicing equipment associated with servicing the aircraft to be ready for a subsequent flight, where preparation time of the servicing equipment is substantially equal to or less than the first predetermined amount of time; (iii) determining, based on information received from a second group of sensors in communication with the one or more processors, that the aircraft landed and has started a taxi-in flight phase prior to reaching the gate by a second predetermined amount of time; (iv) responsively, triggering deployment of the servicing equipment toward the gate, where arrival of the servicing equipment at the gate takes substantially the second predetermined amount of time or less; (v) determining, based on information received from a third group of sensors in communication with the one or more processors, that the aircraft has arrived at the gate; and (vi) responsively, triggering use of the servicing equipment to prepare the aircraft for the subsequent flight.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed herein are systems and methods that may reduce turnaround time of a vehicle/equipment by enhancing speed, efficiency, and accuracy of vehicle/equipment servicing operations. A commercial aircraft is used herein as an example. However, the systems and methods described herein are applicable to any type of vehicle or machinery.

Figure 1:
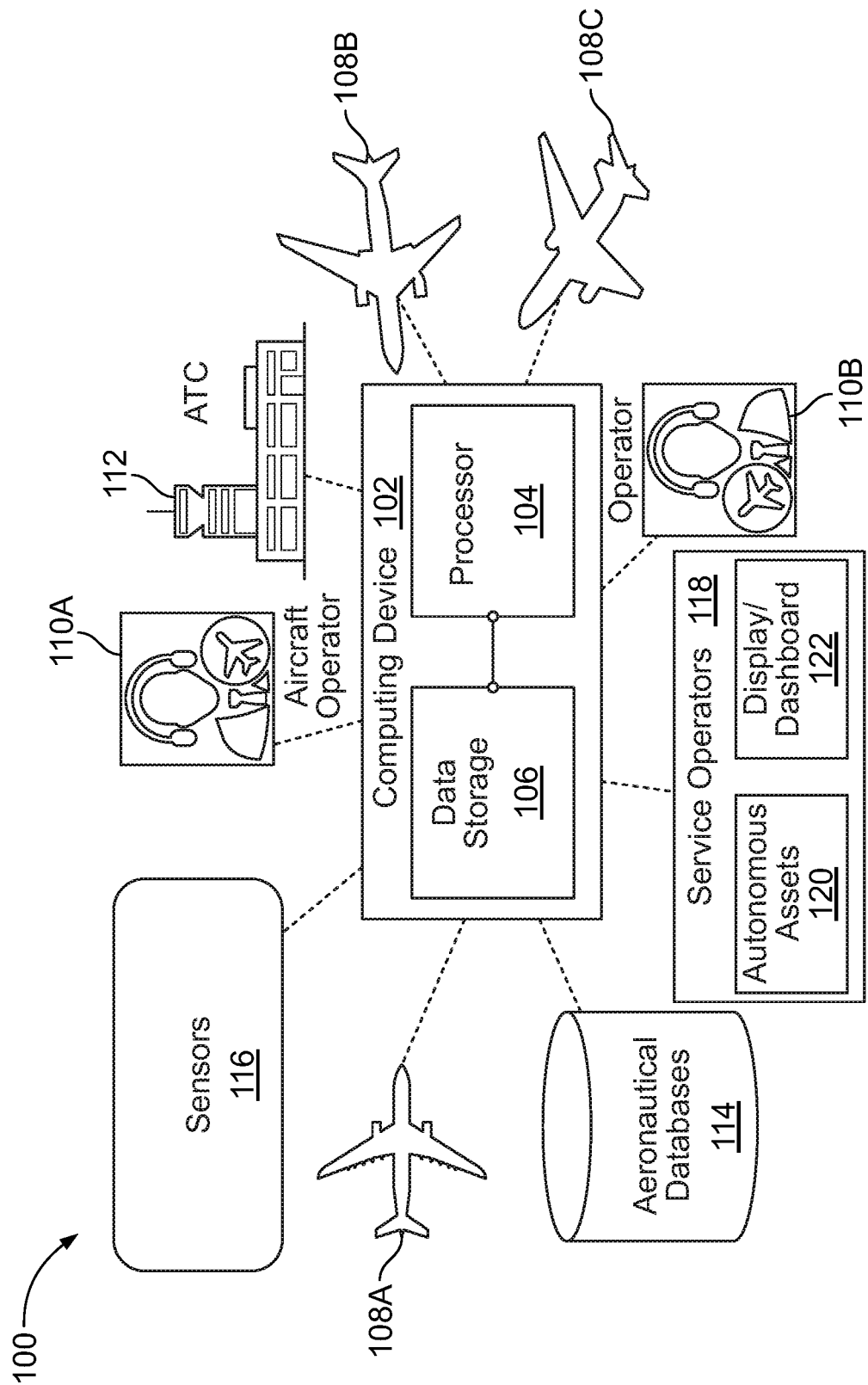
FIG. 1 illustrates system for reducing turnaround time of a vehicle, in accordance with an example implementation.

FIG. 1 illustrates a system 100 for reducing turnaround time of a vehicle, in accordance with an example implementation. Aircraft is used as an example to describe the system 100, but the system 100 could be used for other vehicles or machinery.

The system 100 includes a computing device 102. The computing device 102 may, for example, include one or more servers, tablet computing devices, personal computers, mobile computing devices, or personal digital assistants, etc. The computing device 102 may include a processor (or several processors) 104, and a data storage 106. The data storage 106 may include instructions executable by the processor 104 to cause the computing device 102 to perform the operations described herein. The computing device 102 may further include computing and networking components and databases, which allow secure and reliable sharing of information among the agents and various data sources of the system 100.

The computing device 102 may be in communication with multiple aircraft such as aircraft 108A, 108B, and 108C. Particularly, the aircraft 108A-108C may each have a respective flight management system that includes sensors, navigation modules, trajectory management modules, communication devices, guidance modules, etc. The computing device 102 may be in communication with the flight management system of each aircraft and may thus receive information indicating location, speed, trajectory, expected time of arrival at an airport, etc. for the aircraft. The flight management system may also indicate to the computing device 102 whether there are particular maintenance issues or faults an aircraft is experiencing. The computing device 102 may be in communication with the flight management system directly or indirectly via any network type or protocol (e.g., radio, Wi-Fi, Bluetooth, etc.).

The aircraft 108A-108C may be operated by corresponding aircraft operators (airliners) 110A and 110B. The aircraft operators 110A-110B may include airlines, cargo companies, business aviation operators, or general aviation and military operators.

In an example, the computing device 102 may also be in communication with an Air Traffic Controller (ATC) 112 that provides various services for the safe use of the shared airspace and airports. The ATC 112 may particularly provide ground-based direction to the aircraft 108A-108C through the airspace to prevent collisions, and organize and expedite the flow of air traffic. Thus, by being in communication with the ATC 112, the computing device 102 may receive information indicating the state of air traffic in a given region of the airspace around a particular airport. Thus, the computing device 102 may be configured to estimate arrival times of the aircraft 108A-108C at the airport.

In examples, the system 100 may further include multiple aeronautical databases 114 such as (i) a weather forecast database storing information associated with wind forecast, dangerous weather patterns, etc.; (ii) a Global Trajectories Database storing trajectories of aircraft (e.g., the aircraft 108A-108C); a Global Flight Status Database storing information indicating current parameters (e.g., position, speed, acceleration, altitude, heading, etc.) of a given flight; Airspace Information Databases storing information related to available sectors and routes in a particular regions of the airspace; and Airport Information Database storing information about airports such as layout of airport, map of the gates, configuration and number of runways, operational runways, etc. By being in communication with such databases, the computing device 102 may track the trajectory of the aircraft 108A-108C, predict disruptions (e.g., due to weather, airport, or airspace changes), and accurately estimate time of arrival of the aircraft 108A-108C at the airport.

In an example, the computing device 102 may be in communication with multiple sensors 116. Some of the sensors 116 may be coupled to the aircraft 108A-108C and some of the sensors 116 may be ground-based or space-based (e.g., satellites). As an example, the sensors 116 may include sensors coupled to an aircraft and provide information such as position, speed, acceleration, and heading of the aircraft to the computing device 102. As another example, the sensors 116 may include ground-based Radio Detection and Ranging (RADAR) sensors or systems that track an aircraft and continually provide information indicating position of the aircraft to the computing device 102.

In an example, the sensors 116 may include a landing gear sensor configured to sense deployment of a landing gear of the aircraft, and then provide through the flight management system information indicating the deployment of the landing gear to the computing device 102. As such, the computing device 102 may determine that landing may be imminent. In another example, the sensors 116 may include a weight or load sensor coupled to the landing gear. When the aircraft is flying, i.e., prior to landing, the weight sensor may indicate that the landing gear is not experiencing a weight or load. Upon landing and touching the runway, the weight of the aircraft is supported by the landing gear, and thus the weight sensor may provide information indicating that a load is applied thereto. The computing device 102 may then determine that the aircraft has landed.

In another example, the sensors 116 may include vision systems, such as cameras, Light Detection and Ranging (LIDAR) devices, RADAR device, passive or active Radio-Frequency Identification (RFID) devices, Bluetooth devices etc. These vision systems, devices or sensors may be coupled to the runways, a terminal gate, or a jet bridge (passenger boarding bridge) at the gate. For instance, the vision systems may be configured to capture images of a vicinity of the jet bridge and provide the images to the computing device 102. Accordingly, the computing device 102 may determine whether an aircraft arrived at a particular gate.

In another example, the sensors 116 may include mobile devices such as phones, laptops, personal digital assistants, tablet computing devices, etc. of pilots or crew. Such mobile devices may have a global positioning system (GPS) satellite-based sensor that indicates location of the respective mobile device. By being in communication with such a mobile device, the computing device 102 may determine the location of the mobile device and the aircraft containing the mobile device. An owner of the mobile device may opt-in or out of such configuration.

In examples, the sensors 116 may have a hierarchical structure. For example, the computing device 102 may be configured to probe a subset of the sensors 116 (e.g., a GPS sensor) to determine a location of an aircraft. Then, the computing device 102 may probe another subset of sensors (e.g., ground-based radar or vision systems) to confirm the location of the aircraft.

In some examples, the computing device 102 may assign weights to each sensor of the sensors 116 indicating a degree of accuracy of the sensor given current conditions. For instance, if current weather conditions indicate fog at and around an airport, the computing device 102 may assign a lower weight to a camera-based vision system compared to a position sensor coupled to the aircraft. On the other hand, if the computing device 102 determines that communication with a flight management system of an aircraft is not reliable for any reason, the computing device may assign a large weight to a ground-based radar or vision system in determining the location or position of the aircraft compared to the position sensor.

Thus, by being in communication with the aircraft 108A-108C, the sensors 116, the ATC 112, and the aeronautical databases 114, the computing device 102 may track a trajectory of the aircraft 108A-108C to accurately estimate the location, flight phase, and time of arrival of an aircraft. For instance, the computing device 102 may be configured to determine when an aircraft is in a descent flight phase at which the aircraft begins to decrease its altitude, an approach flight phase at which the aircraft further decreases its altitude in preparation for approaching a landing phase at an airport, a landing phase, a taxi-in phase, or reached operational stop at the gate, among other possible flight phases.

The computing device 102 may further be in communication with service operators 118. The service operators 118 may include operators of cabin services, catering services, ramp services, passenger services, field operation services, etc. The aircraft operators 110A, 110B may perform some of these services, while outsourcing other services. For instance, the aircraft operators 110A, 110B may perform cabin and passenger services while outsourcing fueling and catering services. Thus, the aircraft operators 110A, 110B may be included in the service operators 118.

Each of the service operators 118 may have equipment and personnel associated with performing a corresponding service to the aircraft. The service operators 118 may thus perform operations such as determining a location and status of servicing resources, acquiring, allocating, and assigning the resources to a particular aircraft, preparing the resources for performing the associated service, etc. Many aircraft at the various gates share the resources of a particular service operator of the service operators 118.

In examples, operations involving resource finding, gathering, allocation, and assignment of the resources may be done manually. However, performing these tasks manually may lead to delays due to the potential for lack of coordination and preparedness of equipment. For example, if a fuel truck is assigned to an aircraft after the aircraft lands, delays may take place because preparing the truck by loading it with fuel may take a particular amount of time during which the aircraft is waiting at the gate.

As another example, because various service operators may be responsible for different services, lack of coordination may lead to delays, especially when some tasks are performed in sequence rather than in parallel. For instance, when an aircraft approaches a gate after the taxi-in flight phase, the aircraft is signaled and guided to engage the jet bridge. If no signaling service is available, the aircraft would remain away from the jet bridge. Even if other services such as refueling and catering are ready at the gate, servicing the aircraft does not start until signaling occurs.

As another example, different services may take different amounts of time to be prepared for servicing an aircraft. For example, a refuse truck is first emptied of refuse from a previous flight before being ready for a subsequent service. Similarly, a fuel truck is first driven to a fueling station, takes a turn among other refueling trucks, and is then filled with fuel, thus taking a particular amount of time before being ready to service an aircraft. In contrast, other services may be ready as soon they become available such as a tow vehicle for moving the aircraft.

Thus, if there is no coordination between the different services, or if there is coordination that does not take into consideration respective periods of time associated with preparing each service for servicing an aircraft, delays may occur. Such delays may be more prominent in a site that involves performing such operations on many aircraft sharing a limited number of resources.

As such, in the system 100 disclosed herein, the computing device 102 autonomously tracks the aircraft 108A-108C as well as the various equipment and resources of the service operators 118. The computing device 102 may then perform independent actions on behalf of the service operators 118 to automatically allocate and assign the resources to a particular aircraft based on availability of the resources and the flight phase of the particular aircraft. Particularly, the computing device 102 may detect that an aircraft started a particular phase of flight. The computing device 102 may then trigger or activate preparation of a particular service ahead of arrival of the aircraft, such that the associated service equipment is ready when the aircraft arrives at the gate. Example flight phases of an aircraft are described next.

Figure 2:
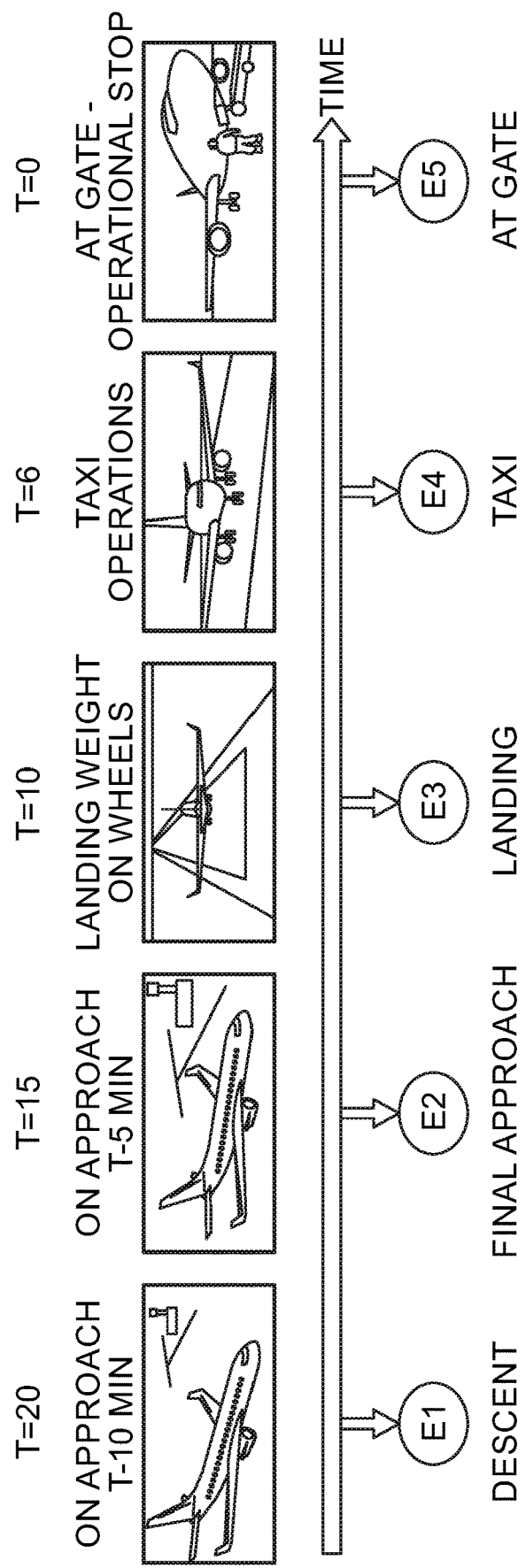
FIG. 2 illustrates phases of flight of an aircraft after a cruising phase until arriving at a gate, in accordance with an example implementation.

FIG. 2 illustrates phases of flight of an aircraft after a cruising phase until arriving at a gate, in accordance with an example implementation. As shown in FIG. 2, in examples, the aircraft (e.g., any of the aircraft 108A-108C) may go through five phases of flight before initiation of servicing operations to the aircraft. A first phase labelled "E1" in FIG. 2 is a descent phase at which an altitude of the aircraft decreases in preparation for approaching the airport and landing. While in the descent phase E1, the aircraft may lose altitude at a constant airspeed and constant angle of descent (e.g., 3 degree). In an example, the descent phase E1 may start prior to reaching the gate by a first predetermined amount of time, e.g., 20 minutes. In an example, the first predetermined amount of time may be measured from the time of landing. In this example, the descent phase E1 may start 10 minutes prior to landing, for example.

The aircraft may remain in the descent phase E1 and gradually lose altitude until reaching a particular altitude (e.g., 1000 feet) at which the aircraft starts a second phase labelled "E2" in FIG. 2, which can be referred as an approach phase. During the approach phase, an altitude of the aircraft decreases in preparation for approaching the airport and landing. Towards the end of the descent phase E1, the aircraft may accelerate slightly to realize the approach phase E2 before taking a landing position. In an example, the approach phase E2 may start prior to reaching the gate by a second predetermined amount of time, e.g., 15 minutes. In an example, the second predetermined amount of time may be measured from the time of landing. In this example, the E2 phase may start 5 minutes prior to landing, for example.

At the end of the approach phase E2, the aircraft assumes a landing position and starts a third phase labelled "E3" in FIG. 2, which can be referred as a landing phase. To land, the airspeed and the rate of descent of the aircraft are reduced to where the aircraft descends at a slow rate to allow for a gentle touch down of the runway. Thus, landing is accomplished by slowing down and descending to the runway. At the beginning of the landing phase E3, the landing gears are deployed. In an example, the landing phase E3 may start prior to reaching the gate by a third predetermined amount of time, e.g., 10 minutes.

After touch-down, the pilot may reverse the aircraft engine's thrust, helping the aircraft to slow down to taxi speeds by redirecting the airflow of the engines forward. Once the aircraft is decelerated to low speed, the aircraft starts a fourth phase labelled "E4" in FIG. 2, which can be referred as a taxi-in phase, during which the aircraft navigates the runways taxiing to the terminal building. In an example, the taxi-in phase E4 may start prior to reaching the gate by a fourth predetermined amount of time, e.g., 6 minutes.

After taxiing to the terminal building, the aircraft arrives at the terminal gate at a fifth phase labelled "E5" in FIG. 2, which can be referred as operational stop phase, during which the aircraft is signaled to its operational stop position at the assigned gate. Once the aircraft achieves operational stop, servicing operations may commence.

The phases depicted in FIG. 2 are examples for illustration only. The number of phases can be reduced or increased. For instance, the descent phase E1 can be grouped with the approach phase E2 into a single phase referred to as descent or approach. Similarly, the landing phase E3 can be grouped with the taxi-in phase E4 into a single phase referred to as landing.

Further, the computing device 102 may capture time stamps associated with when particular events happen and particular phases commence so as to enhance its estimation of the time of arrival of aircraft at the gate over time. This way, the computing device 102 may enhance estimation of time elapsed between the various phases E1, E2, E3, E4, and E5, and thus trigger particular actions at the appropriate time to make various services available to the aircraft upon arrival as discussed below.

Referring back to FIG. 1, in order to automate the servicing operations and render them more efficient, the computing device 102 may track the aircraft as mentioned above to determine the flight phase of the aircraft. For instance, the computing device 102 may track the location, altitude, speed, and heading of the aircraft by being in communication with the flight management system of the aircraft as well as with the ATC 112 and ground-based sensors. As such, the computing device 102 may determine when the aircraft starts the descent phase E1 or the approach phase E2. The computing device 102 may then determine that the aircraft landed (E3) by receiving information from a weight/load sensor coupled to the landing gear or via vision systems at the airport. Further, the computing device 102 may determine that the aircraft is taxiing (E4) or arrived at the gate (E5) via speed and vision sensors, for example.

Thus, in examples, the sensors 116 could be categorized into groups of sensors, each group of sensors may be associated with detecting a flight phase of the five phases E1-E5. The groups of sensor may overlap, such that some of the sensors that are used to determine whether the aircraft is in a particular flight phase could also be used to determine whether the aircraft is in another flight phase.

For instance, a first group of sensors associated with determining whether the aircraft started the descent phase E1 could include altitude, GPS, speed, and heading sensors coupled to the aircraft. A second group of sensors associated with determining whether the aircraft started the approach phase E2 could include one or more of the sensors in the first group of sensors and additionally may include an acceleration sensor and vision sensors that are coupled to the aircraft or are ground-based.

A third group of sensors associated with determining whether the aircraft started the landing phase E3 could include one or more of the sensors in the first and second groups of sensors and additionally may include a load or weight sensor coupled to the landing gear of the aircraft and visions sensors. A fourth group of sensors associated with determining whether the aircraft started the taxi-in phase E4 could include one or more of sensors in the first, second, and third groups of sensors and additionally may include vision sensor (e.g., cameras) mounted in a vicinity of the runway. A fifth group of sensors associated with determining whether the aircraft has reached the operation stop phase E5 at the gate could include one or more of the sensors in the first, second, third, and fourth groups of sensors and additionally may include vision sensors (e.g., cameras) coupled to a jet bridge or at the terminal building to indicate arrival of the aircraft at the gate.

When the computing device 102 determines that the aircraft has started a particular phase, the computing device 102 responsively communicate with and alert a subset of the service operators 118 to acquire, allocate, and prepare their servicing assets, such that when the aircraft arrives at the gate, the assets would be at the gate and ready to service the aircraft. For instance, once the computing device 102 determines that the aircraft started the descent phase E1, the computing device 102 may alert a first subset of the service operators 118 to prepare their servicing assets. The computing device 102 may further communicate with the first subset of the service operators 118 to determine the status of their assets.

The first subset of the service operators 118 may include service operators associated with services that take the first predetermined amount of time or less to be ready for servicing. As an example, the first subset of the service operators 118 may include refueling services because emptying the fuel truck, driving the fuel truck to a fueling station that may be backed-up, and refueling the fuel truck may take the first predetermined amount of time (e.g., 20 minutes) to be ready for servicing the aircraft. Other services that may be alerted and assessed during E1 may include potable water, refuse, and toilet services. Thus, once the computing device 102 determines that the aircraft is in the descent phase E1, the computing device may communicate with the first subset of the service operators 118 to trigger acquisition, allocation, and preparation of assets associated with fueling, potable water, and toilet services to the aircraft.

Similarly, once the computing device 102 determines that the aircraft started the approach phase E2, the computing device 102 may communicate with and alert a second subset of the service operators 118 to acquire, allocate, and prepare their servicing assets, such that when the aircraft arrives at the gate, the assets would be at the gate and ready to service the aircraft. The second subset of the service operators 118 may include service operators associated with services that take the second predetermined amount of time or less to be ready for servicing. As an example, the second subset of the service operators 118 may include catering, baggage conveyers, and cargo unloader operators. Allocating and preparing assets (e.g., hydraulic jacks, trucks, etc.) associated with unloading baggage and cargo from, and loading food to, the aircraft may take the second predetermined amount of time (e.g., 15 minutes) or less to be ready for servicing the aircraft.

Further, when the computing device 102 determines that the aircraft started the landing phase E3, the computing device 102 may communicate with and alert a third subset of the service operators 118. The third subset of the service operators 118 may include service operators associated with services that take the third predetermined amount of time or less to be ready for servicing. As an example, the third subset of the service operators 118 may include air conditioning and electrical service operators because preparing and allocating assets (e.g., tools and equipment) associated with air conditioning and electrical servicing of the aircraft may take the third predetermined amount of time (e.g., 10 minutes) or less to be ready for servicing the aircraft.

Then, once the computing device 102 determines that the aircraft started the taxi-in phase E4, the computing device 102 may cause the servicing assets associated with the first, second, and third subsets of the service operators 118 to start moving toward the gate. For example, the computing device 102 may transmit respective messages to the various service operators 118 requesting that they start moving their servicing vehicles, personnel, and other assets toward the gate assigned to the arriving aircraft.

In another example, as shown in FIG. 1, the service operators 118 may have autonomous assets 120. Autonomous assets may include, for instance, an autonomous vehicle capable of sensing its environment and navigating without human input toward the gate. As a particular example, a service operator associated with towing the aircraft may have a tow bar-less tow vehicle (TLTV) that is autonomous. The autonomous TLTV may be in communication with the computing device 102, and upon determining that the aircraft in the taxi-in phase, the computing device 102 may autonomously send a signal (e.g., wireless signal through a network) on behalf of the corresponding service operator to command the TLTV to move toward the gate. Several other assets (e.g., luggage handling trains or vehicles) may also be autonomous, and the computing device 102 may send respective commands to the respective autonomous assets commanding them to navigate to the gate.

In this manner, occurrence of discrete events (e.g., flight phases) associated with an arriving aircraft triggers allocation and preparation of servicing operations assets on the ground in a staggered manner. This way, the servicing operations assets may be ready to commence servicing the aircraft as soon as the aircraft reaches the gate.

In examples, the service operators 118 may have access to a display or dashboard 122. In an example, each service operator of the service operators 118 may have access to its own dashboard 122. The computing device 102 may be in communication with the various dashboards 122 and may generate a display on each dashboard 122 indicating the status of arriving aircraft (e.g., flight phase of the aircraft 108A-108C) and the requested servicing assets. The service operators 118 may update the status of their assets by indicating, for example, which assets are acquired and allocated to a particular aircraft, the status of preparation of the servicing assets, whether the servicing asset is ready to move toward the gate, etc. As such, the dashboard 122 may include a user-interface that allows for interaction and communication of information between the computing device 102 and the service operators 118.

In examples, each dashboard 122 for a particular service operator may display information associated with that particular service operator, without displaying information associated with other service operators. This way, the dashboard 122 is not cluttered with information that might not be useful to the particular service operator. However, in some examples, a central dashboard may be located where a service manager responsible for turning around the aircraft 108A-108C is located, and the computing device 102 may generate a display associated with the status of all service operators 118 on the central dashboard. This way, the manager may have up-to-date information regarding the status of each service operator and its assets to enhance coordination and response to any obstacles or emergencies.

Further, in examples, the predetermined periods of time mentioned above may be varied based on external environmental conditions. For example, if there are bad weather conditions at or around the airport that might delay each or any of the triggered activities, the predetermined periods of time may be stretched to accommodate any possible delays. As another example, the predetermined periods of time may vary based on the airport. For instance, a busy airport may be assigned longer periods of time to get servicing assets ready as opposed to a municipal or smaller airport. In examples, the computing device 102 may continually track such periods of time and adapt them to continually improve the system 100 and enable continuous improvement and adaptation.

Figure 3:
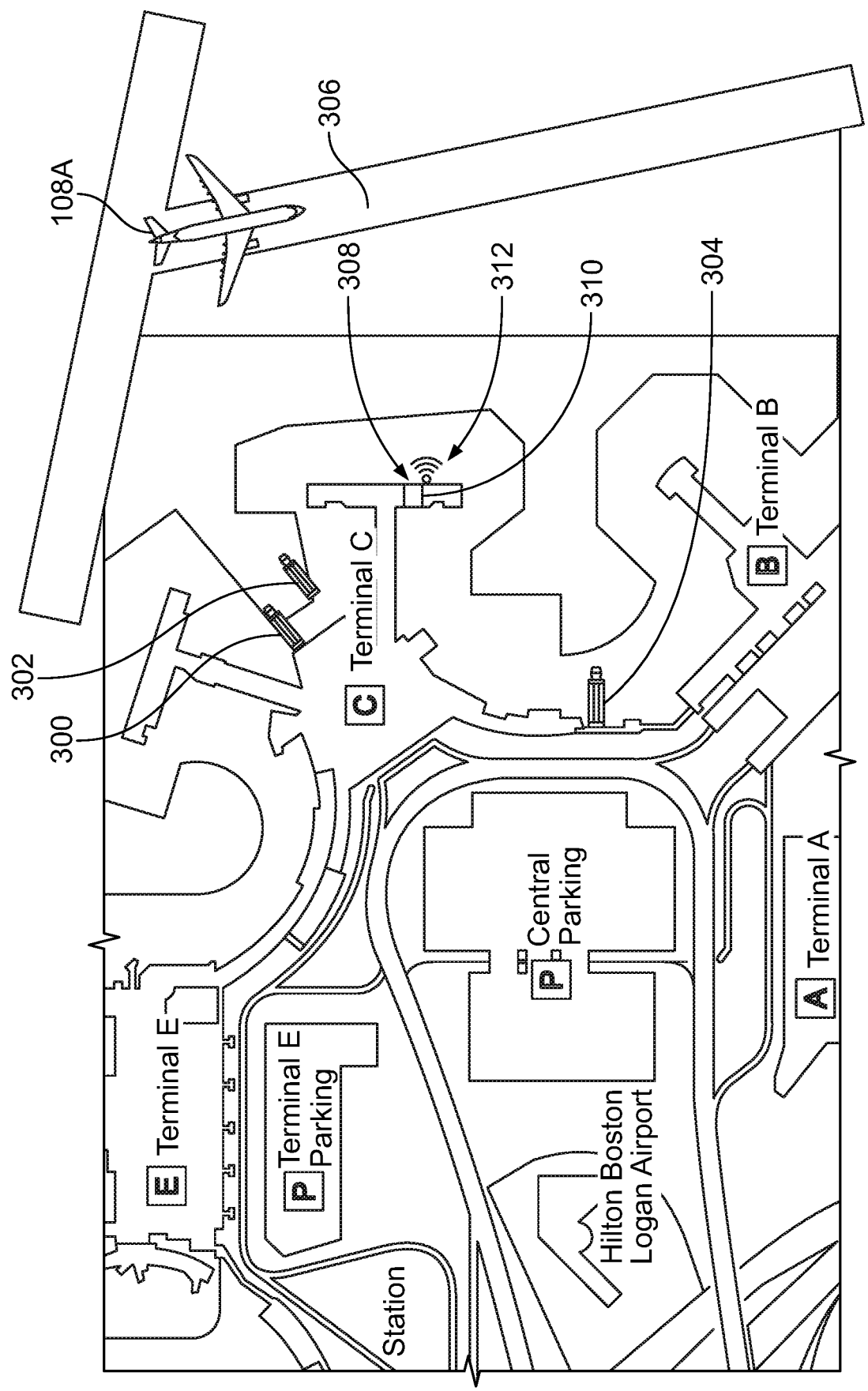
FIG. 3 illustrates an aircraft in a taxi-in flight phase and depicts location of servicing vehicles, in accordance with an example implementation.

FIG. 3 illustrates an aircraft, e.g., the aircraft 108A, in the taxi-in flight phase E4 and depicts location of servicing vehicles 300, 302, and 304, in accordance with an example implementation. As shown in FIG. 3, the servicing vehicles 300, 302, and 304 are located at their respective preparation locations while the aircraft 108A is at the beginning of the taxi-in phase E4 and is about to taxi along a runway 306 to reach a gate 308. At the point in time depicted in FIG. 3 (e.g., 6 minutes of taxi-in time remaining to reach the gate 308), the computing device 102 sends signals requesting or commanding the vehicles 300, 302, and 304 to start moving toward the gate 308. As shown in FIG. 3, a jet bridge 310 is in a retracted position while waiting for the aircraft 108A to reach the gate 308.

Figure 4:
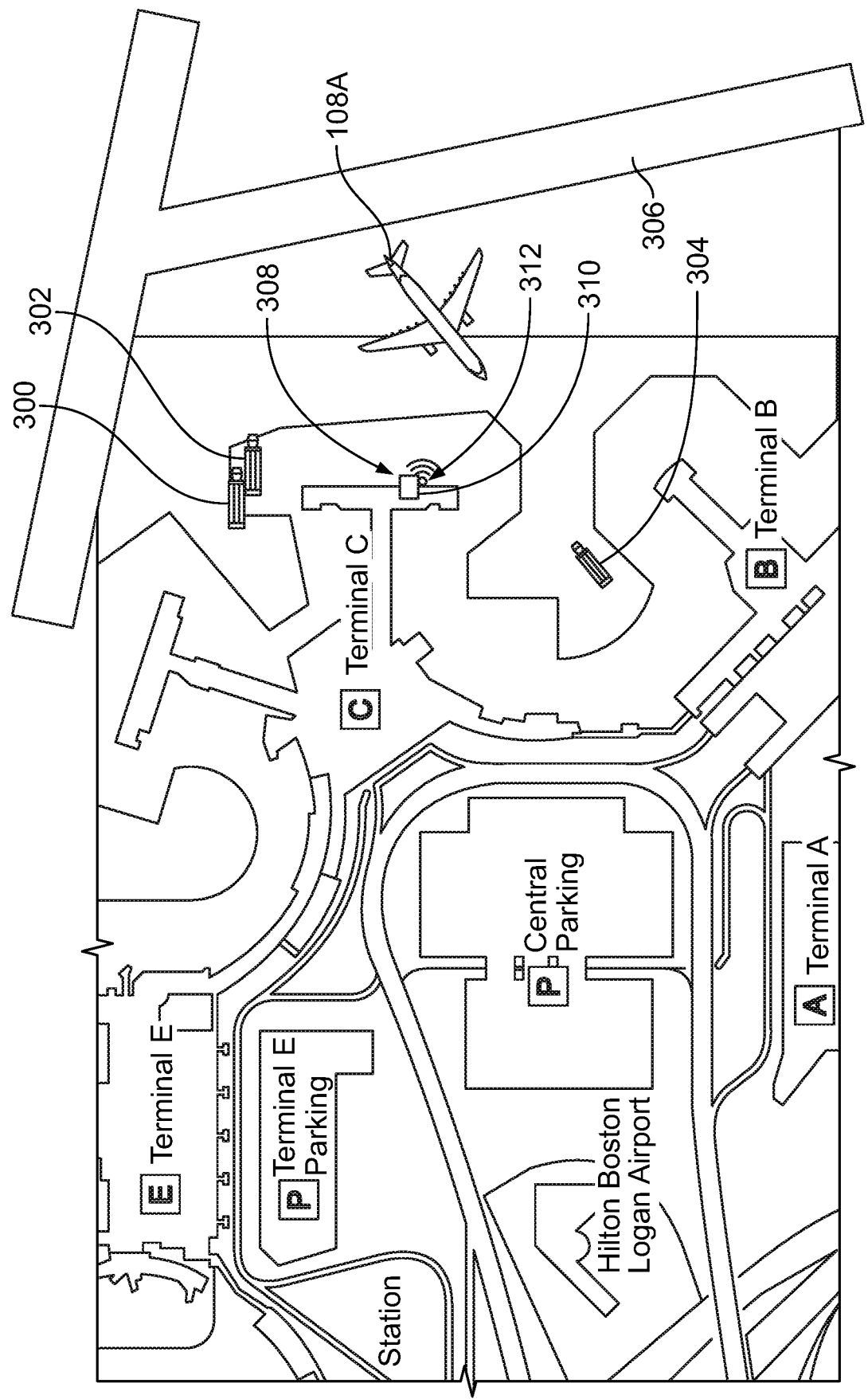
FIG. 4 illustrates servicing vehicles moving toward a terminal gate as an aircraft taxis toward the terminal gate, in accordance with an example implementation.

FIG. 4 illustrates the servicing vehicles 300, 302, and 304 moving toward the gate 308 as the aircraft 108A taxis toward the gate 308, in accordance with an example implementation. As depicted in FIG. 4, the servicing vehicles 300, 302, and 304 have departed their preparation location and are moving toward the gate 308. The aircraft 108A has departed from the runway 306 and is moving toward the gate 308.

A vision sensor 312 (e.g., one of the sensors 116) may be coupled to the jet bridge 310 or the gate 308 so as to track the approach of the aircraft 108A toward the gate 308. The computing device 102 may be in communication with the vision sensor 312 to track the location of the aircraft 108A relative to the gate 308. When the aircraft 108A reaches a particular position near the gate 308, the computing device 102 may request or command the jet bridge 310 to start extending toward the approaching aircraft 108.

Figure 5:
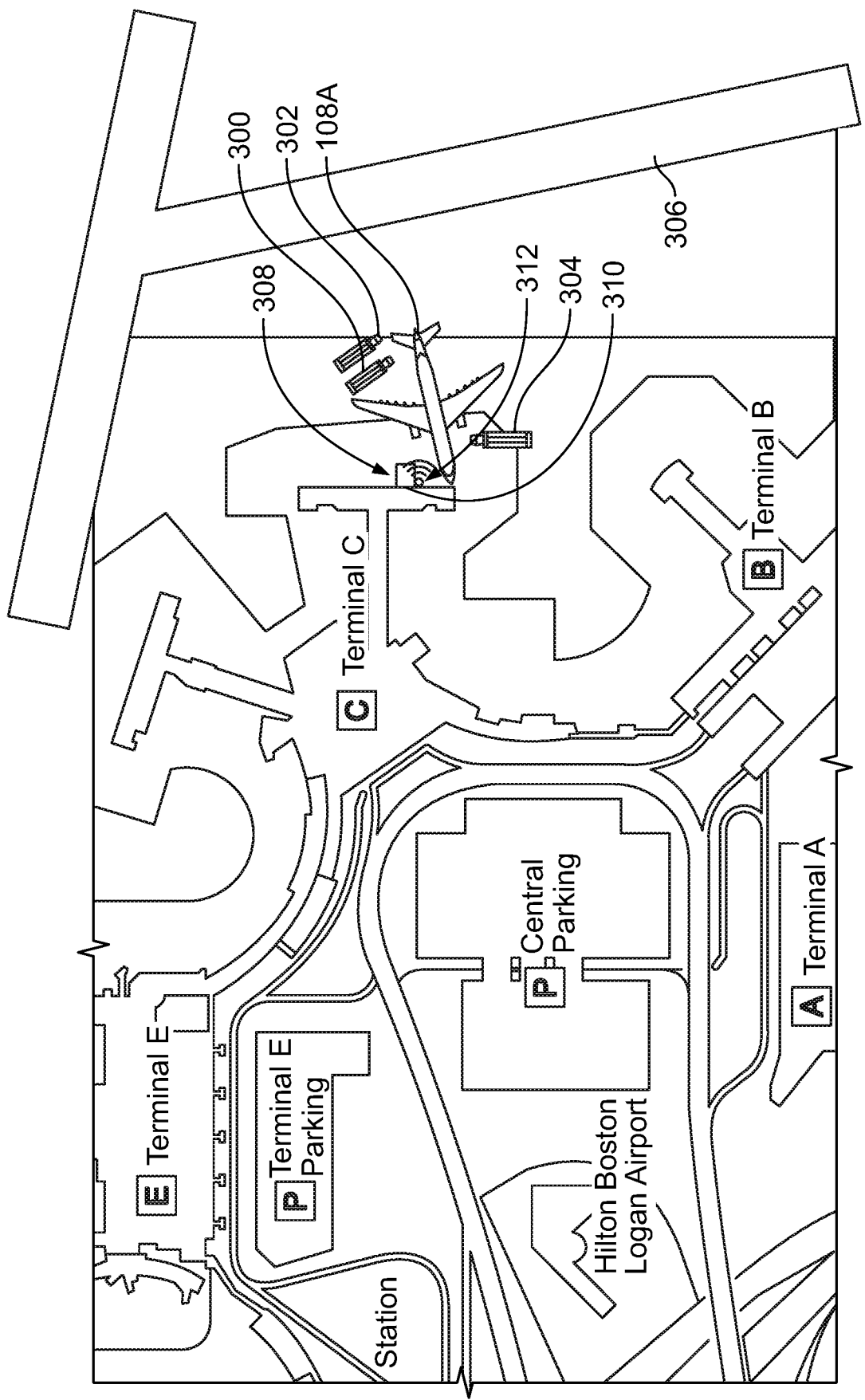
FIG. 5 illustrates arrival of servicing vehicles and an aircraft at a terminal gate, in accordance with an example implementation.

FIG. 5 illustrates arrival of the servicing vehicles 300, 302, and 304 and the aircraft 108A at the gate 308, in accordance with an example implementation. As the aircraft 108A pulls toward the gate 308, the servicing vehicles 300, 302, and 304 also arrive at the gate 308. The jet bridge 310 is also shown extended and ready to engage with the aircraft 108A. In an example, the computing device 102 may command the jet bridge 310 to fully extend when the vision sensor 312 indicates to the computing device 102 that the aircraft 108A has arrived at the gate 308 and is thus in the operational stop phase E5.

In an example, the computing device 102 may have commanded or requested deployment of the servicing vehicles 300, 302, and 304 and the jet bridge 310 such that they arrive at the gate 308 substantially simultaneously with the aircraft 108A (e.g., within a threshold amount of time such as 1 minute from the time of arrival of the aircraft 108A). In another example, the computing device 102 may have commanded or requested deployment of the servicing vehicles 300, 302, and 304 and the jet bridge 310 such that they arrive at the gate 308 before the aircraft 108A, e.g., within 5 minutes before arrival of the aircraft 108A. This way, the computing device 102 may take into consideration or accommodate any unforeseen causes that could slightly delay any of the servicing vehicles 300, 302, 304.

FIGS. 3-5 illustrate only three servicing vehicles 300-304 as an example to reduce visual clutter in the drawings. In examples, the computing device 102 may command and coordinate arrival of many more vehicle and servicing assets to the gate 308 in time to service the aircraft 108A upon its arrival at the gate 308.

Figure 6:
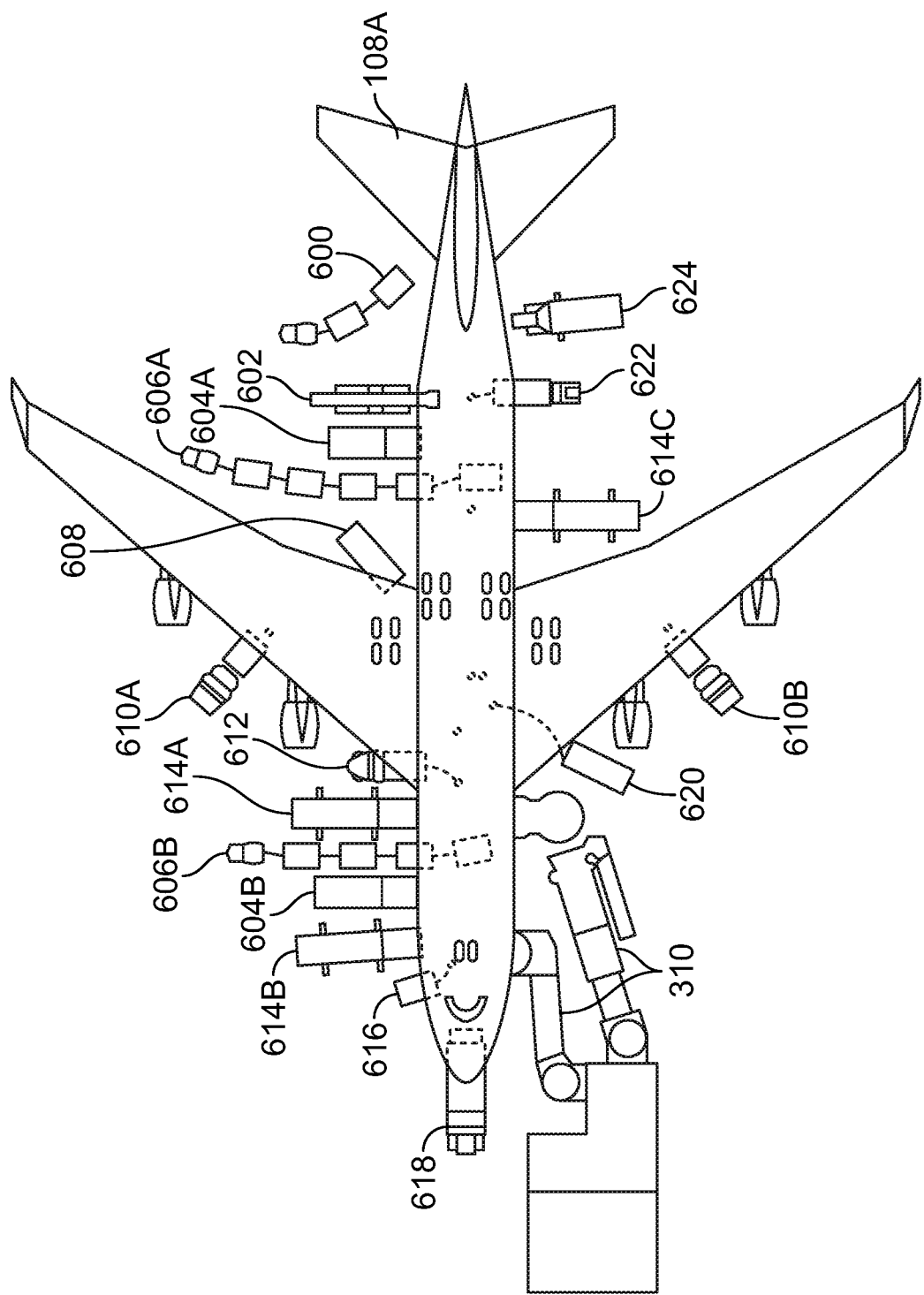
FIG. 6 illustrates various servicing assets deployed to service an aircraft, in accordance with an example implementation.

FIG. 6 illustrates various servicing assets deployed to service the aircraft 108A, in accordance with an example implementation. In the same manner that the computing device 102 initiates, requests or commands, and coordinates the deployment of the servicing vehicles 300-304 and the jet bridge 310, the computing device 102 coordinates deployment of the other servicing assets depicted in FIG. 6. The computing device 102 begins allocation, determine the status of, and request or commands deployment of the various assets in a phased or staggered manner based on the flight phases and the amount of time that a particular asset takes to be prepared as described above with respect to FIGS. 1 and 2.

As depicted in FIG. 6, the servicing assets may include, as examples: a bulk cargo train 600; a bulk cargo loader 602; container loaders 604A, 604B; container trains 606A, 606B; air-start equipment 608 (e.g., power source used to provide the initial rotation to start the engines); a hydrant fuel trucks 610A, 610B; a potable water truck 612; galley service trucks 614A, 614B, 614C; electrical service equipment 616; tow vehicle 618; the jet bridge 310; air conditioning service equipment 620; toilet service truck 622; and cabin service truck 624. Some of these assets and trucks could be autonomous and in communication with the computing device 102, such that the computing device 102 could directly command their deployment. Other assets might not be autonomous, and the computing device 102 may provide signals, messages, commands, or requests to the respective service operators, who then initiate deployment of the respective assets.

In addition to the services shown in FIG. 6, in examples, the computing device 102 may receive from the flight management system of the aircraft 108A information indicating that the aircraft 108 is experiencing particular faults (or fault codes) or deviating behavior in one of its flight systems. The computing device 102 may then allocate and cause deployment of any equipment associated with addressing the faults or deviating behaviors.

As visually depicted in FIG. 6, numerous activities and servicing operations take place to prepare the aircraft 108A for a subsequent flight. The more coordinated and timely the depicted swarm of activities, the shorter the turnaround time of the aircraft 108A, thus leading to reduced cost to the aircraft operators 110A, 110B. The system 100 may allow for automating many of the processes involved in allocation, preparation, coordination, and timely deployment of the various servicing assets.

Particularly, the computing device 102 performs independent actions on behalf of the service operators 118 to assist in the allocation, preparation, coordination, and timely deployment of the various servicing assets. The service operators 118 are notified with a request to deploy their assets fully configured and prepared. If the service operators 118 having autonomous assets, the computing device 102 commands these assets on behalf of the service operators 118 to travel to the site of service (e.g., the gate 308), fully configured and prepared to immediately perform their service to keep the aircraft 108A operating.

In this manner, delays resulting from lack of coordination, preparation, or timely deployment may be eliminated, and servicing personnel may be allowed to efficiently focus on their servicing tasks as opposed to manually allocating, coordinating, and deploying the servicing assets. As a result, speed, efficiency, timeliness, and accuracy of servicing operations may be enhanced, thus reducing turnaround time and cost to the aircraft operators 110A, 110B and enhancing their reputation and profit.

Figure 7:
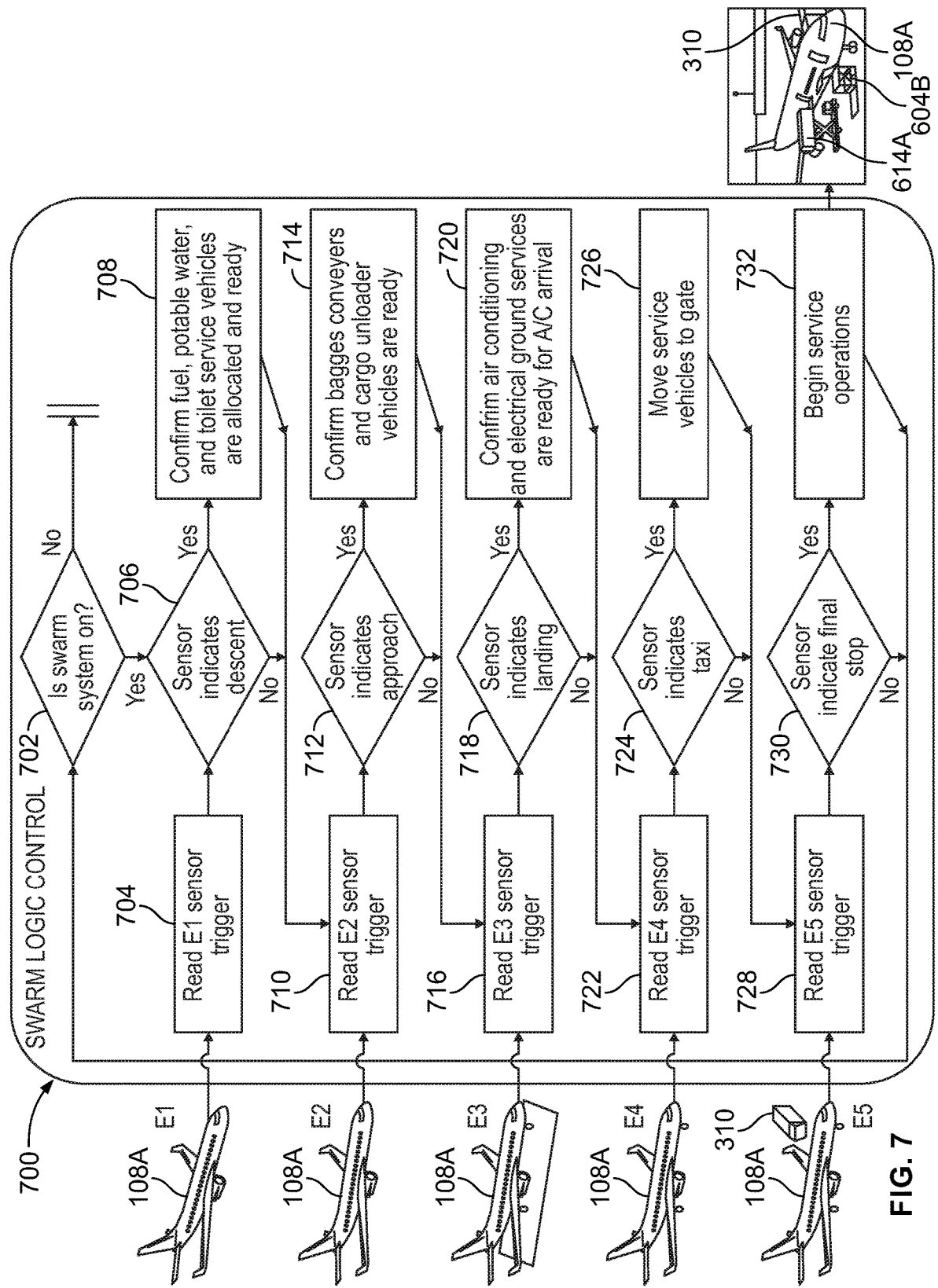
FIG. 7 illustrates a flowchart of swarm control operations implemented by the computing device, in accordance with an example implementation.

FIG. 7 illustrates a flowchart 700 of swarm control operations implemented by the computing device 102, in accordance with an example implementation. The flowchart 700 depicts the operations described above with respect to FIGS. 1-6. The images to the left of the flowchart 700 pictorially depict the aircraft 108A in the above-mentioned five flight phases E1-E5.

At decision block 702, the computing device 102 may determine whether the system 100 or the servicing swarm control operations are enabled. If the system 100 is not enabled, the computing device 102 does not execute the remaining blocks of the flowchart 700.

If the system 100 is enabled, at block 704 the computing device communicates with (e.g., reads or receives information from) a first group of sensors associated with determining whether the aircraft 108A began the descent phase E1. This group of sensors may include, for example, sensors coupled to the aircraft 108A such as altitude, position, speed, heading sensors, etc. For instance, the altitude and position sensors may indicate that the aircraft 108A is within a predetermined distance from the airport, and thus may have started the descent phase E1. The altitude and heading sensors may indicate that the aircraft is losing altitude and is angled with a particular angle consistent with the descent phase E1.

At decision block 706, the computing device 102 determines whether the first group of sensors indicates that the aircraft 108A is in the descent phase E1. A confirmation via the first group of sensors that the aircraft 108A is in the descent phase E1 triggers the computing device 102 to communicate with a first subset of the service operators 118 at block 708 (e.g., fueling, potable water, and toilet service operators) to allocate and prepare the assets associated with their respective services. This way, these assets may be ready to start servicing the aircraft 108A by the time the aircraft 108A reaches the gate 308.

After communicating with the first subset of the service operators 118 or if the first group of sensors indicate that the aircraft 108A has completed the descent phase E1, at block 710 the computing device 102 communicates with (e.g., reads or receives information from) a second group of sensors associated with determining whether the aircraft 108A began the approach phase E2. Similar to the first group of sensors, this group of sensors may include, for example, sensors coupled to the aircraft 108A such as altitude, position, speed, and heading sensors. For instance, the heading sensor may indicate that the aircraft 108A is no longer angled at the descent angle, but has adjusted its heading to a more level heading. The altitude and position sensors may also indicate that the aircraft 108A is now closer to the airport and is within a particular altitude (1000 feet) and thus have started the approach phase E2. Additionally, the second group of sensors could include other sensors such as an acceleration sensor and vision sensors. An acceleration sensor may indicate an increase in an acceleration of the aircraft 108A consistent with a final approach flight phase. Ground-based vision systems may also be able to detect the approach of the aircraft 108A.

At decision block 712, the computing device 102 determines whether the second group of sensors indicates that the aircraft 108A is in the approach phase E2. A confirmation via the second group of sensors that the aircraft 108A is in the approach phase E2 triggers the computing device 102 to communicate with a second subset of the service operators 118 at block 714 (e.g., baggage conveyers, cargo unloaders, and catering services) to allocate and prepare the assets associated with these services. This way, these assets may be ready to start servicing the aircraft 108A by the time the aircraft 108A reaches the gate 308.

After communicating with the second subset of the service operators 118 or if the second group of sensors indicate that the aircraft 108A has completed the approach phase E2, at block 716 the computing device communicates with (e.g., reads or receives information from) a third group of sensors associated with determining whether the landing phase E3 has commenced. As mentioned above, a load or weight sensor coupled to the landing gear may indicate an increase in load due to landing of the aircraft 108A, and accordingly the computing device 102 may determine that the aircraft 108A has landed. Other sensors could also be used to indicate landing such as altitude sensors indicating ground level altitude, visions sensors showing the aircraft 108A on a landing runway, etc.

At decision block 718, the computing device 102 determines whether the third group of sensors indicates that the aircraft 108A is in the landing phase E3. A confirmation via the third group of sensors that the aircraft 108A has landed triggers the computing device 102 to communicate with a third subset of service operators at block 720 (e.g., air conditioning and electrical ground services) to allocate and prepare the assets associated with these services. This way, these assets may be ready to start servicing the aircraft 108A by the time the aircraft 108A reaches the gate 308.

After communicating with the third subset of the service operators 118 or if the third group of sensors indicate that the aircraft 108A has completed the landing phase E3, at block 722 the computing device communicates with (e.g., reads or receives information from) a fourth group of sensors associated with determining whether the aircraft 108A has started the taxi-in phase E4. For example, vision sensors coupled to the runway may indicate to the computing device 102 that the aircraft 108A is navigating the runways on its way to the assigned gate. As another example, the reduced speed of the aircraft 108A captured by a speed sensor of the aircraft 108A may also indicate to the computing device 102 that the aircraft 108A is taxiing. Other sensors could also be used to indicate taxiing.

At decision block 724, the computing device 102 determines whether the fourth group of sensors indicates that the aircraft 108A is in the taxi-in phase E4. A confirmation via the fourth group of sensors that the aircraft 108A is taxiing triggers the computing device 102 to command or request from the service operators at block 726 to move their vehicles, equipment, and personnel toward the gate 308 in anticipation of arrival of the aircraft 108A. In the example where some of the services are performed by autonomous equipment (e.g., an autonomous TLTV), the computing device 102 transmits a message or signal to the autonomous equipment commanding it to move toward the gate 308. By commanding the service operators 118 and the vehicles or equipment to move toward the gate 308, the vehicles and equipment would be ready to start servicing the aircraft 108A when or as soon as the aircraft 108A arrives at the gate 308.

In an example, the computing device 102 may stagger the commands or requests to move the vehicles and equipment toward the gate 308. For example, if a first service takes place before a second service could be performed, the computing device 102 may order the vehicles and equipment of the first service to move toward the gate 308 first. Then, after a predetermined amount of time that the first service is expected to take, the computing device 102 may order the vehicles and equipment of the second service to move toward the gate 308. This way, the space around the aircraft 108A is not cluttered, and thus each service has sufficient space and access to perform the associated servicing operations.

After communicating with the service operators to send their vehicles and equipment to the gate 308, at block 728 the computing device 102 communicates with (e.g., reads or receives information from) a fifth group of sensors associated with determining whether the aircraft 108A has arrived at gate 308, and is thus in the operational stop phase E5. For example, the vision sensor 312 coupled to the jet bridge 310 or another location near the gate 308 may indicate to the computing device 102 that the aircraft 108A has arrived at the gate 308. As another example, the speed sensor of the aircraft 108A may indicate that the aircraft 108A has zero momentum, thus indicating alone or in combination with the vision sensor 312 at the gate 308 that the aircraft 108A is at the gate 308. A GPS sensor coupled to the aircraft 108A could also indicate the position of the aircraft 108A at the gate 308.

At decision block 730, the computing device 102 determines whether the fifth group of sensors indicates that the aircraft 108A is in the operational stop phase E5. A confirmation via the fifth group of sensors that the aircraft 108A is stopped at the gate 308 triggers the computing device 102 to command or request from the service operators 118 that they begin their associated servicing operations at block 732.

For example, as shown pictorially in the image to the left of block 728, the jet bridge 310 is moved or extended toward the aircraft 108A in preparation for unloading passengers. Further, the image to the right of block 732 pictorially shows the container loader 604B and the galley service truck 614A at the aircraft 108A performing their associated servicing operations. The image shows these services as an example for illustration, and in practice many other service trucks and equipment could be at the aircraft 108A performing their associated services as shown in FIG. 6.

Although the flowchart 700 illustrates operations used during normal course of operation between flights or for scheduled events, similar operations could be used to address emergency situations. In an emergency situation, information could be provided to the computing device 102 via the flight management system of an aircraft having the emergency or through the ATC 112 to indicate the emergency situation. In response, the computing device 102 may perform operations similar to the operations of the flowchart 700 to prepare all the services that address the emergency of the aircraft. This way, as soon as the aircraft lands or arrives at a gate or maintenance hangar, the maintenance or servicing assets that address the emergency of the aircraft may be allocated, mobilized, and ready in a timely and coordinated manner to service the aircraft.

Figure 8:
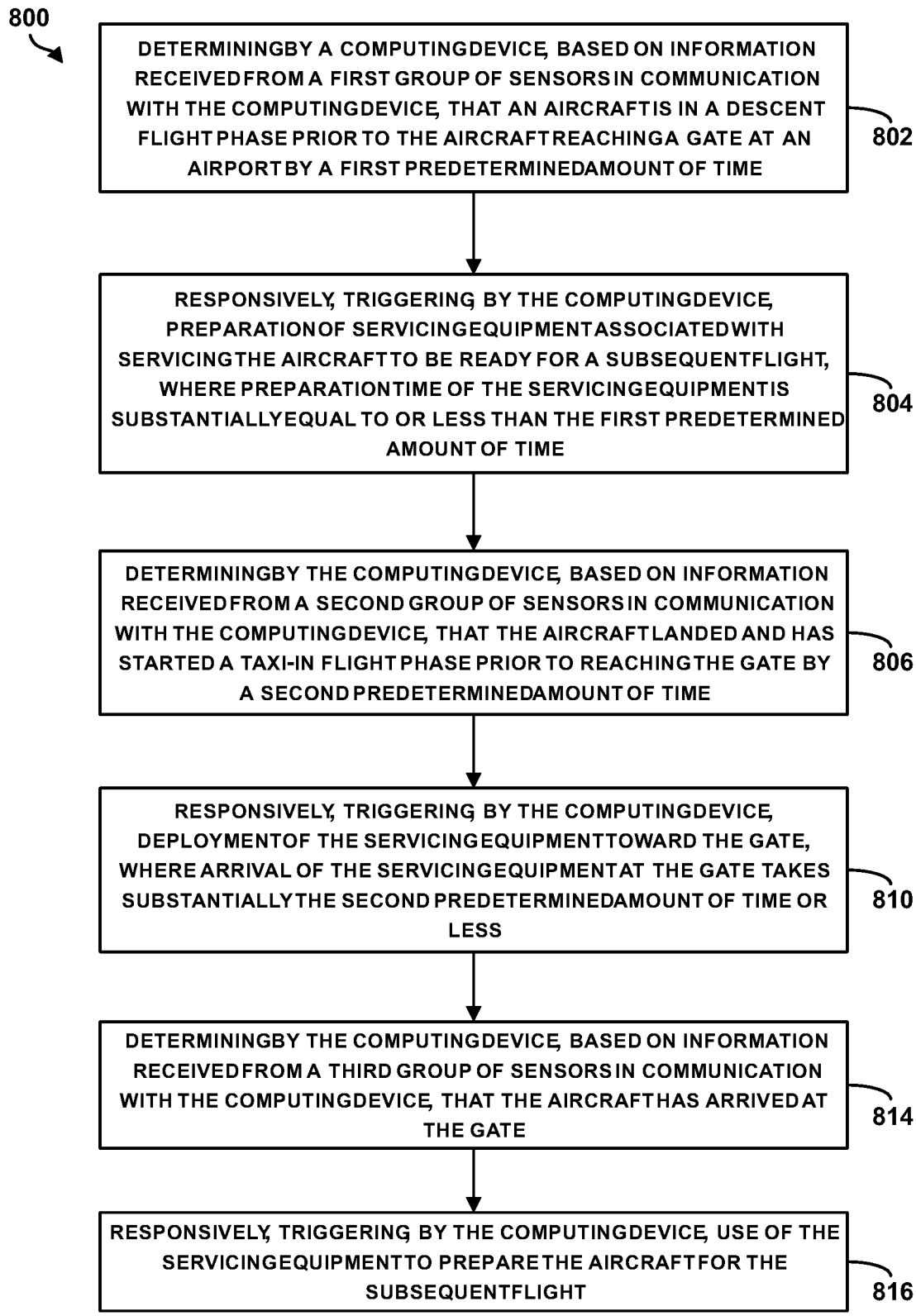
FIG. 8 is a flowchart of a method for rapid vehicle turnaround, in accordance with an example implementation.

FIG. 8 is a flowchart of a method 800 for rapid vehicle turnaround, in accordance with an example implementation. The method 800 could, for example, be performed by the computing device 102 in the context of the system 100. Further, FIGS. 9-12 are flowcharts of methods for use with the method 800.

The method 800 may include one or more operations, or actions as illustrated by one or more of blocks 802-824. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 800 and other processes and operations disclosed herein, the flowchart shows operation of one possible implementation of present examples. In this regard, each block may represent a module, a segment, or a portion of program code, which includes one or more instructions executable by a processor (e.g., the processor 104) or a controller for implementing specific logical operations or steps in the process. The program code may be stored on any type of computer readable medium or memory, for example, such as a storage device including a disk or hard drive (e.g., the data storage 106). The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 800 and other processes and operations disclosed herein, one or more blocks in FIGS. 8-12 may represent circuitry or digital logic that is arranged to perform the specific logical operations in the process.

At block 802, the method 800 includes determining by a computing device, based on information received from a first group of sensors in communication with the computing device, that an aircraft is in a descent flight phase prior to the aircraft reaching a gate at an airport by a first predetermined amount of time. As described above, the computing device 102 may be configured to detect various flight phases of an aircraft by being in communication with various sensors. Some of the sensors could be coupled to the aircraft and in communication with the computing device 102 through the flight management system of the aircraft. Some sensors could be ground-based (RADAR, LIDAR, vision sensors, etc.). In examples, some sensors could be coupled to a terminal building or gate, or coupled to a jet bridge.

Based on sensor information received from a first group of sensors, the computing device 102 may determine that the aircraft started its descent toward an airport. The descent phase may start a predetermined amount of time (e.g., 20 minutes) prior to the aircraft reaching its assigned gate at the airport.

At block 804, the method 800 includes responsively, triggering, by the computing device, preparation of servicing equipment associated with servicing the aircraft to be ready for a subsequent flight, where preparation time of the servicing equipment is substantially equal to or less than the first predetermined amount of time. As described above, some services use equipment that may take longer preparation time than equipment of other services. Upon detecting that the aircraft is in the descent phase, the computing device 102 may trigger servicing operators of services that use the servicing equipment, which takes the first predetermined amount of time to be prepared, to start preparing their equipment. Preparing the equipment may involve, for example, allocation, coordination with other aircraft, and readying the equipment itself (e.g., fueling a fuel truck).

At block 806, the method 800 includes determining by the computing device, based on information received from a second group of sensors in communication with the computing device, that the aircraft landed and has started a taxi-in flight phase prior to reaching the gate by a second predetermined amount of time. The computing device 102 may detect through communication with a second group of sensors that the aircraft landed and is taxiing toward the gate. Taxiing until reaching the gate may take a second predetermined amount of time (e.g., 6-8 minutes).

Figure 9:
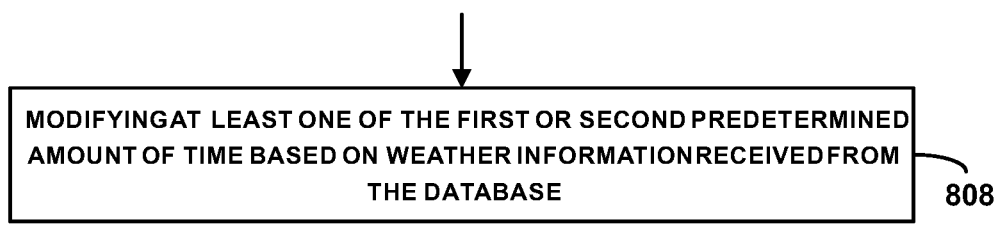
FIG. 9 is a flowchart of a method for use with the method of FIG. 8, in accordance with an example implementation.

FIG. 9 is a flowchart of a method for use with the method 800, in accordance with an example implementation. At block 808, the method includes modifying at least one of the first or second predetermined amount of time based on weather information received from the database. In examples, the computing device 102 may be in communication with a database including information indicative of weather conditions in a vicinity of the airport. If the computing device 102 receives from the database information indicating a change in weather, the computing device 102 may adjust or modify the first or second predetermined amount of time (or both) based on the weather information received from the database. As an example, if the weather information indicates bad weather or a storm, then the computing device 102 may adjust the predetermined amount of time to accommodate the changes. For instance, the computing device may trigger preparation of servicing equipment slightly prior to the aircraft starting a particular phase so as to give servicing operators more preparation time. In another example, if bad weather improves, the computing device 102 may shorten the predetermined amounts of time.

Referring back to FIG. 8, at block 810, the method 800 includes responsively, triggering, by the computing device, deployment of the servicing equipment toward the gate, where arrival of the servicing equipment at the gate takes substantially the second predetermined amount of time or less. Upon detecting that the aircraft is in the taxi-in phase, the computing device 102 may trigger the various service operators to start moving their equipment and personnel toward the gate. In this manner, the equipment reaches the gate at substantially the same time or slightly prior to or after the aircraft reaching the gate.

Figure 10:
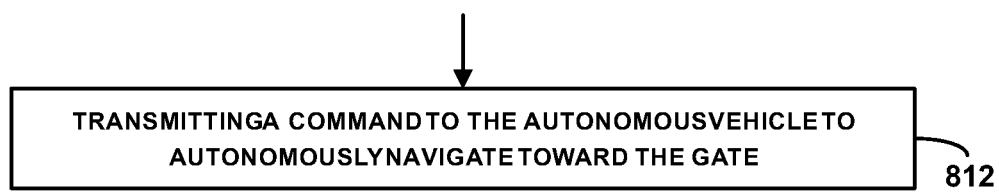
FIG. 10 is a flowchart of a method for use with the method of FIG. 8, in accordance with an example implementation.

FIG. 10 is a flowchart of a method for use with the method 800, in accordance with an example implementation. At block 812, the method includes transmitting a command to the autonomous vehicle to autonomously navigate toward the gate. In some examples, some servicing equipment may be autonomous (e.g., autonomous vehicle, TLTV, etc.). Thus, when the computing device 102 triggers deployment of the servicing equipment, the computing device 102 may transmit a command to the autonomous equipment or vehicle to autonomously navigate itself toward the gate. In this manner, the autonomous equipment or vehicle reaches the gate with the aircraft.

Referring back to FIG. 8, at block 814, the method 800 includes determining by the computing device, based on information received from a third group of sensors in communication with the computing device, that the aircraft has arrived at the gate. For example, vision sensors at the gate or a jet bridge at the gate may indicate to the computing device 102 that the aircraft reached an operational stop at the gate. Other sensors that could also indicate operational stop at the gate may include, for example, a GPS sensor coupled to the aircraft indicating its position at the gate along with a speed sensor indicating that the aircraft stopped.

At block 816, the method 800 includes responsively, triggering, by the computing device, use of the servicing equipment to prepare the aircraft for the subsequent flight. Once the computing device 102 determines that the aircraft arrived at the gate and is at an operational stop, the computing device 102 triggers the servicing equipment to start servicing the aircraft.

The time between the aircraft starting its descent until reaching the gate can be divided into more flight phases, and further actions could be triggered at each phase. For instance, the servicing equipment described with respect to block 804 may be a first set of servicing equipment, and other sets of servicing equipment could be triggered for preparation at other flight phases.

Figure 11:
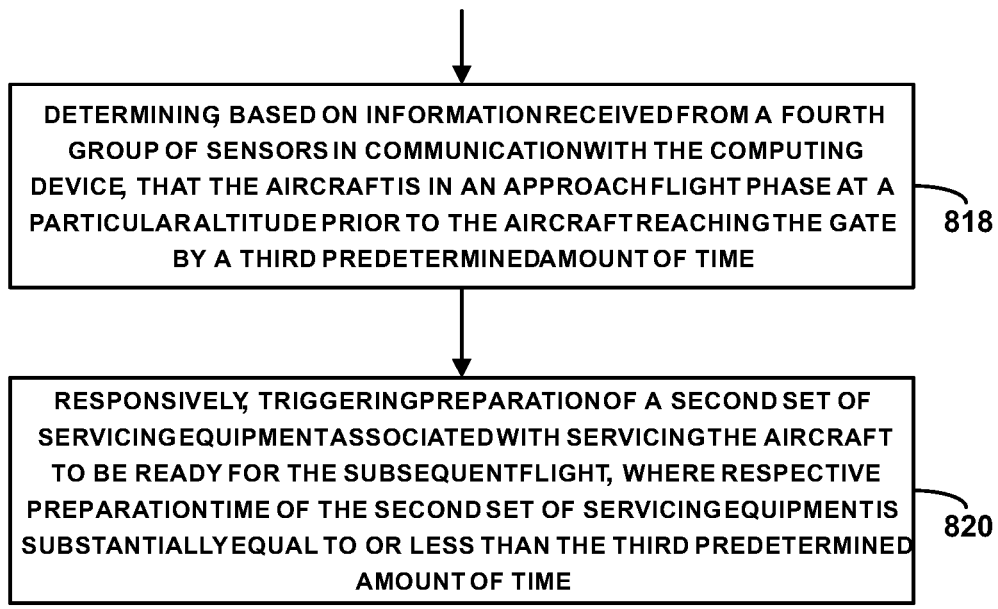
FIG. 11 is a flowchart of a method for use with the method of FIG. 8, in accordance with an example implementation.

FIG. 11 is a flowchart of a method for use with the method 800, in accordance with an example implementation. At block 818, the method includes determining, based on information received from a fourth group of sensors in communication with the computing device, that the aircraft is in an approach flight phase at a particular altitude prior to the aircraft reaching the gate by a third predetermined amount of time. Between the descent phase and landing, the aircraft may go through an approach phase where the aircraft reaches a particular altitude and adjusts its speed and angle in preparation for landing. Thus, the computing device 102 may determine based on information from sensors (e.g., heading, speed, altitude, etc.) that the aircraft is in the approach phase. The aircraft may take a third predetermined amount of time (e.g., 15 minutes) from the approach phase until reaching the gate.

At block 820, the method includes, responsively, triggering preparation of a second set of servicing equipment associated with servicing the aircraft to be ready for the subsequent flight, where respective preparation time of the second set of servicing equipment is substantially equal to or less than the third predetermined amount of time. The second set of servicing equipment may include, for example, baggage conveyers and cargo unloader or any other equipment that takes the third predetermined amount of time to be prepared for servicing the aircraft. When the computing device 102 triggers deployment of the servicing equipment toward the gate, it deploys the first and second sets of servicing equipment, where arrival of the first and second sets of servicing equipment at the gate takes substantially the second predetermined amount of time or less.

Figure 12:
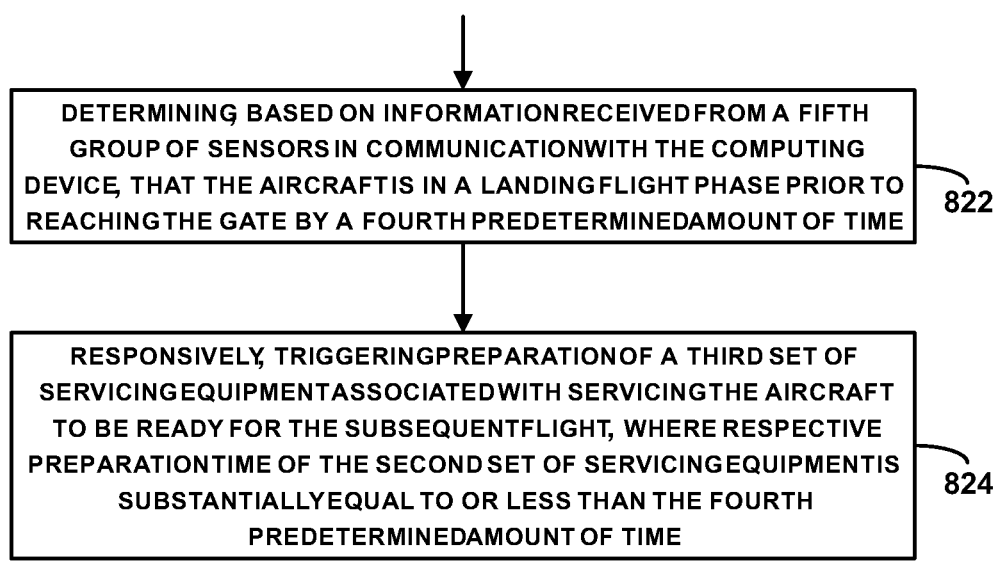
FIG. 12 is a flowchart of a method for use with the method of FIG. 8, in accordance with an example implementation.

FIG. 12 is a flowchart of a method for use with the method 800, in accordance with an example implementation. As another example of an additional flight phase, at block 822, the method includes determining, based on information received from a fifth group of sensors in communication with the computing device, that the aircraft is in a landing flight phase prior to reaching the gate by a fourth predetermined amount of time. Between the approach phase and beginning to taxi toward the gate, the aircraft goes through a landing flight phase where the aircraft deploys the landing gear and adjusts it heading (e.g., raises its nose), in preparation for touching down on the runway. Thus, the computing device 102 may determine based on information from sensors (e.g., heading, landing gear sensor, etc.) that the aircraft is in the landing phase. For instance, the fifth group of sensors may include a load sensor coupled to the landing gear of the aircraft, and the computing device 102 may determine that the aircraft is in the landing flight phase based on the load sensor indicating an increase in load experienced by the landing gear upon the landing gear touching the runway. The aircraft may take a fourth predetermined amount of time (e.g., 10 minutes) from landing until reaching the gate.

At block 824, the method includes, responsively, triggering preparation of a third set of servicing equipment associated with servicing the aircraft to be ready for the subsequent flight, where respective preparation time of the third set of servicing equipment is substantially equal to or less than the fourth predetermined amount of time. The third set of servicing equipment may include, for example, air conditioning and electrical servicing equipment or any other equipment that takes the fourth predetermined amount of time to be prepared for servicing the aircraft. When the computing device triggers deployment of the servicing equipment toward the gate, it deploys of the various sets of servicing equipment, where arrival of the various sets of servicing equipment at the gate takes substantially the second predetermined amount of time or less.

Although the systems, methods, and flowcharts described above refer to an aircraft, these systems, methods, and flowcharts could be used for any other type of vehicles or machinery. For example, operations similar to the operations depicted in FIGS. 7 and 8, could be implemented to ship operations. A computing device would be in communication with sensors associated with the state of the ship in addition to any other monitoring services. The computing device may thus track the ship and its condition prior to arrival of the ship to a particular harbor.

The trip of the ship could be divided to phases similar to the phases described above with respect to FIG. 2. The predetermined amount of time may be measured in hours or days in this case. For instance, a predetermined number of days prior to arrival of the ship, the computing device may perform independent actions on behalf of service operators to coordinate and deploy their assets at the time of arrival of the ship to the harbor or a docking location. Similar services operators to the ones described above service a ship. For example, fueling, cargo services, food services, and container loaders and unloader are examples of services that are performed on a ship to prepare it for a next route or trip.

Similarly, instead of a commercial aircraft, the operations of FIGS. 7 and 8 may be implemented on a helicopter, cars, trucks, etc. The operations could also be implemented regarding maintenance of machinery in a factory. A computing device may track and monitor health of a particular machine or equipment and may proactively coordinate allocation and deployment of servicing assets to service the machine or equipment when the service is required to keep the machine or equipment running.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
   determining, by a computing device in communication with a plurality of sensors categorized into groups of sensors, each group of sensors being associated with detecting a respective flight phase of an aircraft different from other flight phases respectively detected by other groups of the sensors of the plurality of sensors, based on information received from a first group of sensors of the groups of sensors, that the aircraft is in a descent flight phase prior to the aircraft reaching a gate at an airport by a first predetermined amount of time;
   responsively, triggering, by the computing device, preparation of servicing equipment associated with servicing the aircraft to be ready for a subsequent flight, wherein preparation time of the servicing equipment is substantially equal to or less than the first predetermined amount of time;
   determining by the computing device, based on information received from a second group of sensors of the groups of sensors, that the aircraft landed and has started a taxi-in flight phase prior to reaching the gate by a second predetermined amount of time, wherein the second group of sensors configured to indicate that the aircraft landed and has started the taxi-in flight phase is different from the first group of sensors configured to indicate that the aircraft is in the descent flight phase;
   responsively, triggering, by the computing device, deployment of the servicing equipment toward the gate, wherein arrival of the servicing equipment at the gate takes substantially the second predetermined amount of time or less;
   determining by the computing device, based on information received from a third group of sensors in communication with the computing device, that the aircraft has arrived at the gate; and
   responsively, triggering, by the computing device, use of the servicing equipment to prepare the aircraft for the subsequent flight.

2. The method of claim 1, wherein the servicing equipment is a first set of servicing equipment, and wherein the method further comprises:
   determining, based on information received from a fourth group of sensors in communication with the computing device, that the aircraft is in an approach flight phase at a particular altitude prior to the aircraft reaching the gate by a third predetermined amount of time; and
   responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

3. The method of claim 1, wherein the servicing equipment is a first set of servicing equipment, and wherein the method further comprises:
   determining, based on information received from a fourth group of sensors in communication with the computing device, that the aircraft is in a landing flight phase prior to reaching the gate by a third predetermined amount of time; and
   responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

4. The method of claim 3, wherein the fourth group of sensors comprises a load sensor coupled to a landing gear of the aircraft, wherein determining that the aircraft is in the landing flight phase is based on the load sensor indicating an increase in load experienced by the landing gear upon the landing gear touching a runway.

5. The method of claim 1, wherein at least one of the first, second, or third group of sensors include at least one sensor coupled to the aircraft and one sensor that is ground-based.

6. The method of claim 1, wherein the computing device is in communication with a database including information indicative of weather conditions in a vicinity of the airport, and wherein the method further comprises:
   modifying at least one of the first or second predetermined amount of time based on weather information received from the database, wherein determining, based on information received from the first group of sensors of the groups of sensors, that the aircraft is in the descent flight phase comprises:
   assigning to each sensor a weight indicative of a degree of accuracy of the sensor based on the weather conditions in the vicinity of the airport.

7. The method of claim 1, wherein the servicing equipment includes at least one autonomous vehicle, and wherein triggering deployment of the servicing equipment toward the gate comprises transmitting a command to the autonomous vehicle to autonomously navigate toward the gate.

8. A non-transitory computer readable medium having stored therein instructions that, in response to execution by a computing device in communication with a plurality of sensors categorized into groups of sensors, each group of sensors being associated with detecting a respective flight phase of an aircraft different from other flight phases respectively detected by other groups of the sensors of the plurality of sensors, cause the computing device to perform operations comprising:

determining, based on information received from a first group of sensors of the groups of sensors, that the aircraft is in a descent flight phase prior to the aircraft reaching a gate at an airport by a first predetermined amount of time;

responsively, triggering preparation of servicing equipment associated with servicing the aircraft to be ready for a subsequent flight, wherein preparation time of the servicing equipment is substantially equal to or less than the first predetermined amount of time;

determining, based on information received from a second group of sensors of the groups of sensors, that the aircraft landed and has started a taxi-in flight phase prior to reaching the gate by a second predetermined amount of time, wherein the second group of sensors configured to indicate that the aircraft landed and has started the taxi-in flight phase is different from the first group of sensors configured to indicate that the aircraft is in the descent flight phase;

responsively, triggering deployment of the servicing equipment toward the gate, wherein arrival of the servicing equipment at the gate takes substantially the second predetermined amount of time or less;

determining, based on information received from a third group of sensors in communication with the computing device, that the aircraft has arrived at the gate; and responsively, triggering use of the servicing equipment to prepare the aircraft for the subsequent flight.

9. The non-transitory computer readable medium of claim 8, wherein the servicing equipment is a first set of servicing equipment, and wherein the operations further comprise:

determining, based on information received from a fourth group of sensors in communication with the computing device, that the aircraft is in an approach flight phase at a particular altitude prior to reaching the gate by a third predetermined amount of time; and responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

10. The non-transitory computer readable medium of claim 8, wherein the servicing equipment is a first set of servicing equipment, and wherein the operations further comprise:

determining, based on information received from a fourth group of sensors, that the aircraft is in a landing flight phase prior to reaching the gate by a third predetermined amount of time; and responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

11. The non-transitory computer readable medium of claim 10, wherein the fourth group of sensors comprises a load sensor coupled to a landing gear of the aircraft, wherein determining that the aircraft is in the landing flight phase is based on the load sensor indicating an increase in load experienced by the landing gear upon the landing gear touching a runway.

12. The non-transitory computer readable medium of claim 8, wherein at least one of the first, second, or third group of sensors includes at least one sensor coupled to the aircraft and one sensor that is ground-based.

13. The non-transitory computer readable medium of claim 8, wherein the third group of sensors includes a vision sensor coupled to the gate or a jet bridge at the gate.

14. The non-transitory computer readable medium of claim 8, wherein the servicing equipment includes at least one autonomous vehicle, and wherein triggering deployment of the servicing equipment toward the gate comprises transmitting a command to the autonomous vehicle to autonomously navigate toward the gate.

15. A system comprising:

one or more processors;

a plurality of sensors in communication with the one or more processors and categorized into groups of sensors, wherein each group of sensors is associated with detecting a respective flight phase of an aircraft that is different from other flight phases respectively detected by other groups of the sensors of the plurality of sensors; and data storage storing thereon instructions, that when executed by the one or more processors, cause the one or more processors to perform operations comprising:

determining, based on information received from a first group of sensors of the groups of sensors, that the aircraft is in a descent flight phase prior to the aircraft reaching a gate at an airport by a first predetermined amount of time;

responsively, triggering preparation of servicing equipment associated with servicing the aircraft to be ready for a subsequent flight, wherein preparation time of the servicing equipment is substantially equal to or less than the first predetermined amount of time;

determining, based on information received from a second group of sensors of the groups of sensors, that the aircraft landed and has started a taxi-in flight phase prior to reaching the gate by a second predetermined amount of time, wherein the second group of sensors is different from the first group of sensors;

responsively, triggering deployment of the servicing equipment toward the gate, wherein arrival of the servicing equipment at the gate takes substantially the second predetermined amount of time or less;

determining, based on information received from a third group of sensors in communication with the one or more processors, that the aircraft has arrived at the gate; and responsively, triggering use of the servicing equipment to prepare the aircraft for the subsequent flight.

16. The system of claim 15, wherein the servicing equipment is a first set of servicing equipment, and wherein the operations further comprise:

determining, based on information received from a fourth group of sensors in communication with the one or more processors, that the aircraft is in an approach flight phase when the aircraft reaches a particular altitude prior to reaching the gate by a third predetermined amount of time; and responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

17. The system of claim 15, wherein the servicing equipment is a first set of servicing equipment, and wherein the operations further comprise:

determining, based on information received from a fourth group of sensors in communication with the one or more processors, that the aircraft is in a landing flight phase prior to reaching the gate by a third predetermined amount of time; and responsively, triggering preparation of a second set of servicing equipment associated with servicing the aircraft to be ready for the subsequent flight, wherein respective preparation time of the second set of servicing equipment is substantially equal to or less than the third predetermined amount of time, and wherein triggering deployment of the servicing equipment toward the gate comprises triggering deployment of the first and second sets of servicing equipment, wherein arrival of the first and second sets of servicing equipment at the gate takes substantially the second predetermined amount of time or less.

18. The system of claim 15, wherein at least one of the first, second, or third group of sensors includes at least one sensor coupled to the aircraft and one sensor that is ground-based.

19. The system of claim 18, wherein the at least one sensor coupled to the aircraft indicates position, speed, acceleration, altitude, or heading direction of the aircraft, and the sensor that is ground-based includes a vision sensor, a Light Detection and Ranging (LIDAR) device, a RADAR, a passive RFID, an active RFID, or a Bluetooth device.

20. The system of claim 15, wherein the servicing equipment includes at least one autonomous vehicle, and wherein triggering deployment of the servicing equipment toward the gate comprises transmitting a command to the autonomous vehicle to autonomously navigate toward the gate.

* * * * *